US012650333B2

(12) United States Patent
Lecoeuche

(10) Patent No.: US 12,650,333 B2
(45) Date of Patent: Jun. 9, 2026

(54) OPTICAL FIBER-BASED SENSING MEMBRANE LAYOUT

(71) Applicant: VIAVI SOLUTIONS INC., Chandler, AZ (US)

(72) Inventor: Vincent Lecoeuche, Tarentaise (FR)

(73) Assignee: VIAVI SOLUTIONS INC., Chandler, AZ (US)

( * ) Notice: Subject to any disclaimer, the term of this patent is extended or adjusted under 35 U.S.C. 154(b) by 289 days.

(21) Appl. No.: 18/344,356

(22) Filed: Jun. 29, 2023

(65) Prior Publication Data
US 2024/0263994 A1 Aug. 8, 2024

(30) Foreign Application Priority Data

Feb. 7, 2023 (EP) ..................................... 23305160

(51) Int. Cl.
| | |
|---|---|
| *G01H 9/00* | (2006.01) |
| *B60L 58/10* | (2019.01) |
| *G01L 1/24* | (2006.01) |
| *B60L 50/64* | (2019.01) |

(52) U.S. Cl.
CPC .............. *G01H 9/004* (2013.01); *B60L 58/10* (2019.02); *G01L 1/242* (2013.01); *B60L 50/64* (2019.02)

(58) Field of Classification Search
None
See application file for complete search history.

(56) References Cited

U.S. PATENT DOCUMENTS

| | | |
|---|---|---|
| 2014/0203783 A1 | 7/2014 | Kiesel et al. |
| 2017/0011667 A1 | 1/2017 | Sanchez et al. |
| 2017/0033414 A1 | 2/2017 | Ganguli et al. |
| (Continued) | | |

FOREIGN PATENT DOCUMENTS

| | | |
|---|---|---|
| CN | 111102934 B | 3/2021 |
| EP | 2187472 A2 | 5/2010 |
| (Continued) | | |

OTHER PUBLICATIONS

Bel, "Fiber Flex Optical Circuits", Stratos Optical Technologies, downloaded from the Internet on May 27, 2022, 3 pages.

(Continued)

*Primary Examiner* — Eric S. McCall
*Assistant Examiner* — Nigel H Plumb
(74) *Attorney, Agent, or Firm* — Mannava & Kang, P.C.

(57) ABSTRACT

According to examples, an optical fiber-based sensing membrane may include at least one optical fiber, and a substrate. The at least one optical fiber may be integrated in the substrate. The optical fiber-based sensing membrane may include, based on a specified geometric pattern of the at least one optical fiber, an optical fiber-based sensing membrane layout. The substrate may include a thickness and a material property that are specified to ascertain, via the at least one optical fiber and based on the optical fiber-based sensing membrane layout, a thermal and/or a mechanical property associated with a device, or a radiation level associated with a device environment. The specified geometric pattern of the at least one optical fiber may include a spiral geometric pattern, and each spiral of the spiral geometric pattern includes no direct neighbor.

20 Claims, 12 Drawing Sheets

(56)     References Cited

U.S. PATENT DOCUMENTS

| | | | |
|---|---|---|---|
| 2018/0011002 A1* | 1/2018 | Farhadiroushan ... | G01M 11/086 |
| 2018/0321325 A1 | 11/2018 | Fortier et al. | |
| 2018/0364115 A1 | 12/2018 | Brown et al. | |
| 2019/0006157 A1 | 1/2019 | O'Banion et al. | |
| 2022/0333976 A1* | 10/2022 | Cuenot ............... | G01K 15/005 |

FOREIGN PATENT DOCUMENTS

| | | |
|---|---|---|
| EP | 2638372 A2 | 9/2013 |
| EP | 2672234 A1 | 12/2013 |
| EP | 2928006 A1 | 10/2015 |
| EP | 2975366 A1 | 1/2016 |
| EP | 2978043 A1 | 1/2016 |
| KR | 102364685 B1 | 2/2022 |
| WO | 2017040525 A1 | 3/2017 |

OTHER PUBLICATIONS

Bosboom et al., "Ribbon Tapes, Shape Sensors, and Hardware", Conference Paper- Sep. 2015, Conference: Smart Intelligent Aircraft Structures (SARISTU): Proceedings of the Final Project ConferenceAt: pp. 349-406vol. Part IV.

Ferreira da Silva et al., "Development of Skin-Foils With Embedded Optical Fiber Sensors", Semana de Engenharia 2010, 8 pages.

General Wire Products, Inc., "Comparison Chart of Typical Insulation Materials", downloaded on the Internet on May 27, 2022, 6 pages.

Han et al., "Multi-Scale Low-Entropy Method for Optimizing the Processing Parameters during Automated Fiber Placement", Materials 2017, 10, 1024, Sep. 3, 2017, 18 pages.

Long et al., "Stability of amorphous-Silicon TFTs deposited on clear plastic substrates at 250° C. to 280° C.", Article in IEEE Electron Device Letters, vol. 27, NP. 2, Feb. 2006, pp. 111-113.

TE connectivity, "High Density Versatile Optical Flex Circuit Cable Assemblies", downloaded on the Internet on May 27, 2022, 2 pages.

EPO, "The extended Search Report for European Application No. 23212962.7", dated May 8, 2024, 8 pages.

EPO, "Examination Report pursuant to Article 94(3) EPC for Application No. EP23212962.7", dated Mar. 2, 2026, 4 pages.

* cited by examiner

320

OPTICAL FIBER

FLAT SUPPORT PLATE

318

DTS

318

FIBER OPTIC

DTS

THERMAL STIMULUS

320

OPTICAL FIBER-BASED SENSING MEMBRANE LAYOUT

PRIORITY

This present application claims priority under 35 U.S.C. 119(a)-(d) to European patent application number 23305160.6, having a filing date of Feb. 7, 2023, the disclosure of which is hereby incorporated by reference in its entirety.

BACKGROUND

Optical fibers may be utilized in various industries such as communications, medical, military, broadcast, etc., to transmit data and for other related applications. Examples of applications may include sensing of temperature, mechanical strain, vibrations, and/or radiation dosage by utilizing an optical fiber. In this regard, principles of Raman, Rayleigh, and/or Brillouin scattering may be implemented for sensing of the temperature, mechanical strain, vibrations, and/or radiation dosage.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
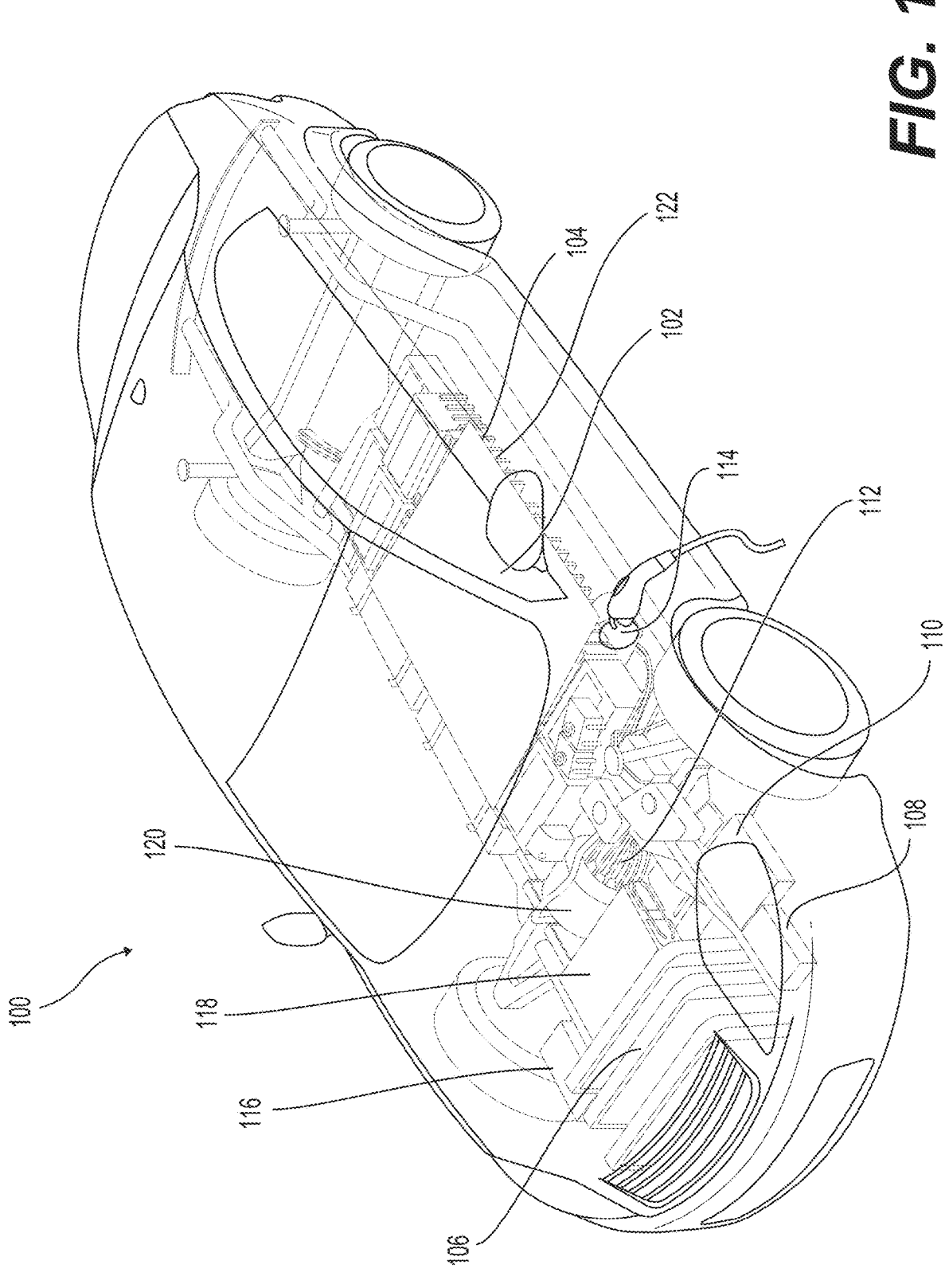
FIG. 1 illustrates an electric vehicle including an optical fiber-based sensing membrane, according to an example of the present disclosure.

For simplicity and illustrative purposes, the present disclosure is described by referring mainly to examples thereof. In the following description, details are set forth in order to provide an understanding of the present disclosure. It will be readily apparent however, that the present disclosure may be practiced without limitation to these details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

According to examples disclosed herein, an optical fiber-based sensing membrane may include at least one optical fiber, and a flexible substrate. The at least one optical fiber may be integrated in the flexible substrate. The optical fiber-based sensing membrane may include, based on a specified geometric pattern of the at least one optical fiber, an optical fiber-based sensing membrane layout. The flexible substrate may include a thickness and a material property that are specified to ascertain, via the at least one optical fiber and based on the optical fiber-based sensing membrane layout, a thermal and/or a mechanical property associated with a device. The specified geometric pattern of the at least one optical fiber may include a spiral geometric pattern, and each spiral of the spiral geometric pattern includes no direct neighbor. Examples of mechanical properties may include strain, vibration, and other such properties. The device may include, for example, a battery pack of an electric vehicle, or any other type of flat or curved structure that is to be monitored. Applications may include and not be limited to the monitoring of an energy storage plant based on batteries, monitoring of a nuclear power plant, and monitoring of defense equipment. Yet further, the substrate may be flexible or rigid. For example, with respect to a surface application of the sensing membrane on a device or an embedded application of the sensing membrane in a device, the optical fiber may be embedded in a rigid sensing membrane formed of a rigid substrate. According to another example, with respect to an optical fiber integrated in a molded part of a device such as a battery pack, the optical fiber may be embedded in a rigid sensing membrane formed of a rigid substrate.

With respect to fiber sensing generally, in some applications, an optical fiber may be utilized to monitor thermal and/or mechanical properties of a device. The device as utilized herein may be any type of machine, component, structure, etc., that is to be monitored. For example, for a device such as an electric vehicle battery pack that includes a plurality of battery cells, an optical fiber may be utilized to monitor thermal and/or mechanical properties of the battery pack. In this regard, embedding of an optical fiber directly into the device may not be feasible due to technical challenges related, for example, to laying, coiling, and/or attaching optical connectors each time an independent element (e.g., battery cell of the battery pack) of the device needs to be addressed.

In order to address at least the aforementioned technical challenges, the optical fiber-based sensing membrane disclosed herein may include at least one optical fiber integrated in a flexible substrate, and include, based on a specified geometric pattern of the at least one optical fiber, an optical fiber-based sensing membrane layout. According to examples disclosed herein, the optical fiber-based sensing membrane may utilize, for example, a Polyimide flex, or other such materials. In this regard, the optical fiber-based sensing membrane may also house components such as electrical tracks, sensors, and optical connectors to reduce an electrical harness associated with utilization of the optical fiber-based sensing membrane.

Yet further, with respect to the optical fiber-based sensing membrane disclosed herein, in some cases, it may be technically challenging to obtain the two-dimensional spatial resolution expected, as defined by the spiral dimension. The spiral may also be referred to hereinafter as a pixel. If a local thermal event has the size of a pixel but is positioned halfway between two pixels, the temperature amplitude reading may be reduced and affected on two pixels.

In order to address at least the aforementioned technical challenges, for the optical fiber-based sensing membrane disclosed herein, by analyzing the pattern and presence or not of sidelobes, an event may be localized, and if needed, the temperature and footprint may be corrected based on this data. For example, if a local thermal event has the same dimensions as one pixel and is precisely centered onto one pixel, thermal conduction and radiation may already affect all four neighboring pixels. If the same event was in between four sensing pixels, it will not affect more than those 4 pixels. Thus, the optical fiber-based sensing membrane disclosed herein may include a layout such that a neighboring pattern in a two-dimensional/three-dimensional map does not correspond to a neighboring fiber of the one-dimensional acquisition.

According to examples disclosed herein, the optical fiber-based sensing membrane layout may include various types of layouts. For example, the layouts may include single or multiple optical fibers, single-end or dual-end access to the optical fibers, a spiral with multiple layers, sliding loops, an optical fiber-based sensing membrane embedded in a battery cell insert, loops in series, an optical fiber embedded in battery molded parts, and other types of layouts.

According to examples disclosed herein, the optical fiber-based sensing membrane may sense various types of parameters associated with a device. For example, the parameters may include temperature, strain, vibration, radiation dosage and other such parameters.

According to examples disclosed herein, different types of parameters sensed by the optical fiber-based sensing membrane may be used to generate different types of notifications or alarms. For example, a temperature variation that exceeds a specified temperature threshold may be used to generate a first type of notification or alarm. Similarly, a strain variation that exceeds a specified strain threshold (e.g., due to damage to the device) may be used to generate a second type of notification or alarm. The occurrence of so-called thermal runaway of a battery element may also be classified through the analysis of the temporal evolution and in particular the rate of change of temperature or strain.

According to examples disclosed herein, a number of elements of the device being monitored may be scaled without the need to add optical connections. For example, a length or configuration of the optical fiber-based sensing membrane may be modified as needed to account for an increased or a decreased number of elements being monitored. In this regard, one or more optical connections may be utilized for an optical fiber-based sensing membrane, and a size of the optical fiber-based sensing membrane may be increased or decreased as needed to address a plurality of devices, without the need to include an optical connection for each device. Thus a single optical connection may be implemented for a plurality of devices being monitored, thus reducing the potential of a fault associated with operation of the optical fiber-based sensing membrane.

According to examples disclosed herein, the devices that are being monitored may remain accessible, for example, for maintenance and other such activities, without being restricted by optics associated with the optical fiber-based sensing membrane. For example, the optical fiber-based sensing membrane may be configured to address a specified area of the device being monitored, leaving other areas of the device accessible for maintenance and other activities.

According to examples disclosed herein, the optical fiber-based sensing membrane may itself remain accessible, for example, for maintenance and other such activities. In this regard, the optical fiber-based sensing membrane may be configured to address a specified area of the device being monitored, leaving other areas of the optical fiber-based sensing membrane accessible for maintenance and other activities.

According to examples disclosed herein, the optical fiber-based sensing membrane may be implemented in a relatively harsh environment. For example, the environment of the optical fiber-based sensing membrane may include relatively significant temperature variations on the order of $-40°$ C. to $140°$ C. The material used for the optical fiber-based sensing membrane may supersede a standard coating of optical fibers and continue to protect the optical fiber mechanically beyond the melting point of coating.

According to examples disclosed herein, the optical fiber-based sensing membrane layout may include a two-dimensional or a three-dimensional configuration. The two-dimensional configuration may include a plurality of optical fibers embedded in a substrate and configured as a two-dimensional plane structure to match a corresponding two-dimensional surface of a device that is to be monitored for temperature and/or strain variations, and/or vibrations. The three-dimensional configuration may include a plurality of optical fibers embedded in a substrate and configured as a three-dimensional structure to match a corresponding three-dimensional shape of a device that is to be monitored for temperature and/or strain variations, and/or vibrations. Depending on the dimensions of the structure to be monitored, the budget loss of the fiber system and the dynamic range of the interrogator, distances may be covered in a single chain, or with multiple fibers in parallel that may be accessed sequentially from a single interrogator by means of an optical switch.

According to examples disclosed herein, the optical fiber-based sensing membrane may be utilized with an optical time-domain reflectometer (OTDR) to determine temperature and/or strain associated with a device. The OTDR may represent an optoelectronic instrument used to characterize an optical fiber, for example, of the optical fiber-based sensing membrane. The OTDR may inject a series of optical pulses into an optical fiber under test. Based on the injected optical pulses, the OTDR may extract, from the same end of the optical fiber in which the optical pulses are injected, light that is scattered or reflected back from points along the optical fiber. The scattered or reflected light that is gathered back may be used to characterize the optical fiber. For example, the scattered or reflected light that is gathered back may be used to detect, locate, and measure events at any location of the optical fiber. The events may include faults at any location of the optical fiber. Other types of features that may be measured by the OTDR include attenuation uniformity and attenuation rate, segment length, and location and insertion loss of connectors and splices.

The OTDR may be used to determine both Brillouin and Rayleigh traces for an optical fiber, for example, of the optical fiber-based sensing membrane. In one example, in an initial acquisition, Brillouin frequency shift and Brillouin power may be used to implement an absolute referencing of a Rayleigh reference trace (or traces). The Rayleigh reference trace may represent a reference point for subsequent measurements of the Rayleigh frequency shift. In this regard, the absolute referencing of the Rayleigh reference trace (or traces) may then be used to determine temperature and/or strain associated with an optical fiber by using the Brillouin frequency shift and the Rayleigh frequency shift in subsequent acquisitions.

According to examples disclosed herein, the optical fiber-based sensing membrane may be utilized with the OTDR to determine, based on distributed measurement, temperature, strain, and/or vibrations associated with a device, such as a battery pack.

According to examples disclosed herein, an optical fiber-based sensing membrane may include at least one optical fiber and a substrate. The at least one optical fiber may be integrated in the substrate. The optical fiber-based sensing membrane may include, based on a specified geometric pattern of the at least one optical fiber, an optical fiber-based sensing membrane layout. The substrate may include a thickness and a material property. The thickness and the material property may be specified to ascertain, via the at least one optical fiber and based on the optical fiber-based sensing membrane layout, a thermal and/or a mechanical property associated with a device, or a radiation level associated with a device environment. The specified geometric pattern of the at least one optical fiber may include a spiral geometric pattern, and each spiral of the spiral geometric pattern includes no direct neighbor.

For the optical fiber-based sensing membrane described above, the device may include a battery pack of an electric vehicle.

For the optical fiber-based sensing membrane described above, the mechanical property may include strain and/or vibration.

For the optical fiber-based sensing membrane described above, a row of spirals of the spiral geometric pattern may be axially offset from adjacent rows of spirals to provide a maximal density in a specified direction.

For the optical fiber-based sensing membrane described above, rows of spirals of the spiral geometric pattern for a path of an optical fiber of the at least one optical fiber may include an intermediate row of spirals of the spiral geometric pattern for the path of the optical fiber of the at least one optical fiber.

According to examples disclosed herein, a method may include embedding an optical fiber-based sensing membrane in a device or contiguously engaging the optical fiber-based sensing membrane with the device. The optical fiber-based sensing membrane may include at least one optical fiber, and a substrate. The at least one optical fiber may be integrated in the substrate. The optical fiber-based sensing membrane may include, based on a specified geometric pattern of the at least one optical fiber, an optical fiber-based sensing membrane layout. The substrate may include a thickness and a material property. The method may further include ascertaining, via the embedded or the contiguously-engaged optical fiber-based sensing membrane, a thermal or a mechanical property associated with the device. The specified geometric pattern of the at least one optical fiber may include a spiral geometric pattern, and each spiral of the spiral geometric pattern includes no direct neighbor.

For the method described above, the optical fiber-based sensing membrane may be transparent so as to receive light. In this regard, the method may further include transmitting, by the at least one optical fiber, received light to an interrogator, and receiving, based on an analysis of the light by the interrogator and from the interrogator, a signal. The method may further include generating, based on the received signal, an alarm. In this regard, the at least one optical fiber may collect light from all directions, and conduct the light towards an interrogator. Thus, light may be detected by the same photodetector already used for distributed sensing. A fault signal that appears as an extra level may add to a permanently acquired reflectometric signal, and an alarm may be raised accordingly.

For the method described above, a row of spirals of the spiral geometric pattern may be axially offset from adjacent rows of spirals to provide a maximal density in a specified direction.

For the method described above, rows of spirals of the spiral geometric pattern for a path of an optical fiber of the at least one optical fiber may include an intermediate row of spirals of the spiral geometric pattern for the path of the optical fiber of the at least one optical fiber.

For the method described above, ascertaining, via the embedded or the contiguously-engaged optical fiber-based sensing membrane, the thermal or the mechanical property associated with the device may include analyzing a sidelobe pattern in a temperature plot associated with the optical fiber-based sensing membrane.

For the method described above, ascertaining, via the embedded or the contiguously-engaged optical fiber-based sensing membrane, the thermal or the mechanical property associated with the device may include determining whether the sidelobe pattern includes no sidelobe, and based on a determination that the sidelobe pattern includes no sidelobe, specifying the thermal or the mechanical property associated with the device as a type of event associated with no sidelobe.

For the method described above, ascertaining, via the embedded or the contiguously-engaged optical fiber-based sensing membrane, the thermal or the mechanical property associated with the device may include determining whether the sidelobe pattern includes four sidelobes in two dimensions, and based on a determination that the sidelobe pattern includes four sidelobes in two dimensions, specifying the thermal or the mechanical property associated with the device as a type of event associated with four sidelobes in two dimensions.

For the method described above, ascertaining, via the embedded or the contiguously-engaged optical fiber-based sensing membrane, the thermal or the mechanical property associated with the device may include determining whether the sidelobe pattern includes four sidelobes in one dimension, and based on a determination that the sidelobe pattern includes four sidelobes in one dimension, specifying the thermal or the mechanical property associated with the device as a type of event associated with four sidelobes in one dimension.

For the method described above, ascertaining, via the embedded or the contiguously-engaged optical fiber-based sensing membrane, the thermal or the mechanical property associated with the device may include determining whether the sidelobe pattern includes six sidelobes in two dimensions, and based on a determination that the sidelobe pattern includes six sidelobes in two dimensions, specifying the thermal or the mechanical property associated with the device as a type of event associated with six sidelobes in two dimension.

According to examples disclosed herein, an optical fiber-based sensing membrane may include at least one optical fiber formed in a specified geometric pattern. The specified geometric pattern of the at least one optical fiber may include a spiral geometric pattern, and each spiral of the spiral geometric pattern includes a specified layout relative to a neighboring spiral.

According to examples disclosed herein, a method for correcting a temperature reading may be based on an analysis of whether a thermal event is smaller than a sensing cell, or partially covers one or several sensing cells. The analysis of the sidelobes may provide information on a location and extent of a thermal event. The knowledge of the thermal properties of a sensing membrane within the host materials, and a history of thermal maps may be used to determine corrections to apply, for example, by increasing the amplitude and the rate of change, and reducing the spatial footprint of the thermal event.

According to examples disclosed herein, if the fiber layout includes direct neighbors in one dimension and/or at specific locations (e.g., in the periphery of a membrane), the partial information available may be utilized (e.g., merged sidelobes) to determine the location and the extent of a thermal event, and to apply a correction accordingly.

FIG. 1 illustrates an electric vehicle 100 including an optical fiber-based sensing membrane 102 (hereinafter referred to as "sensing membrane 102"), according to an example of the present disclosure. Referring to FIG. 1, the electric vehicle 100 may include the sensing membrane 102 disposed on a device, such as a battery pack 104. As disclosed herein, the sensing membrane 102 may include an optical fiber-based sensing membrane layout (hereinafter referred to as "sensing membrane layout 122") to accurately detect and measure temperature and/or strain variations, and/or vibrations, particularly for relatively small devices or for applications that need a relatively small spatial resolution.

The electric vehicle 100 may include other known components such as a thermal system 106 for cooling the vehicle, an auxiliary battery 108, an onboard battery charger 110, a vehicle transmission 112, a charge port 114 for the battery pack 104, a converter 116, a power electronics controller 118, and an electric traction motor 120.

Figure 2:
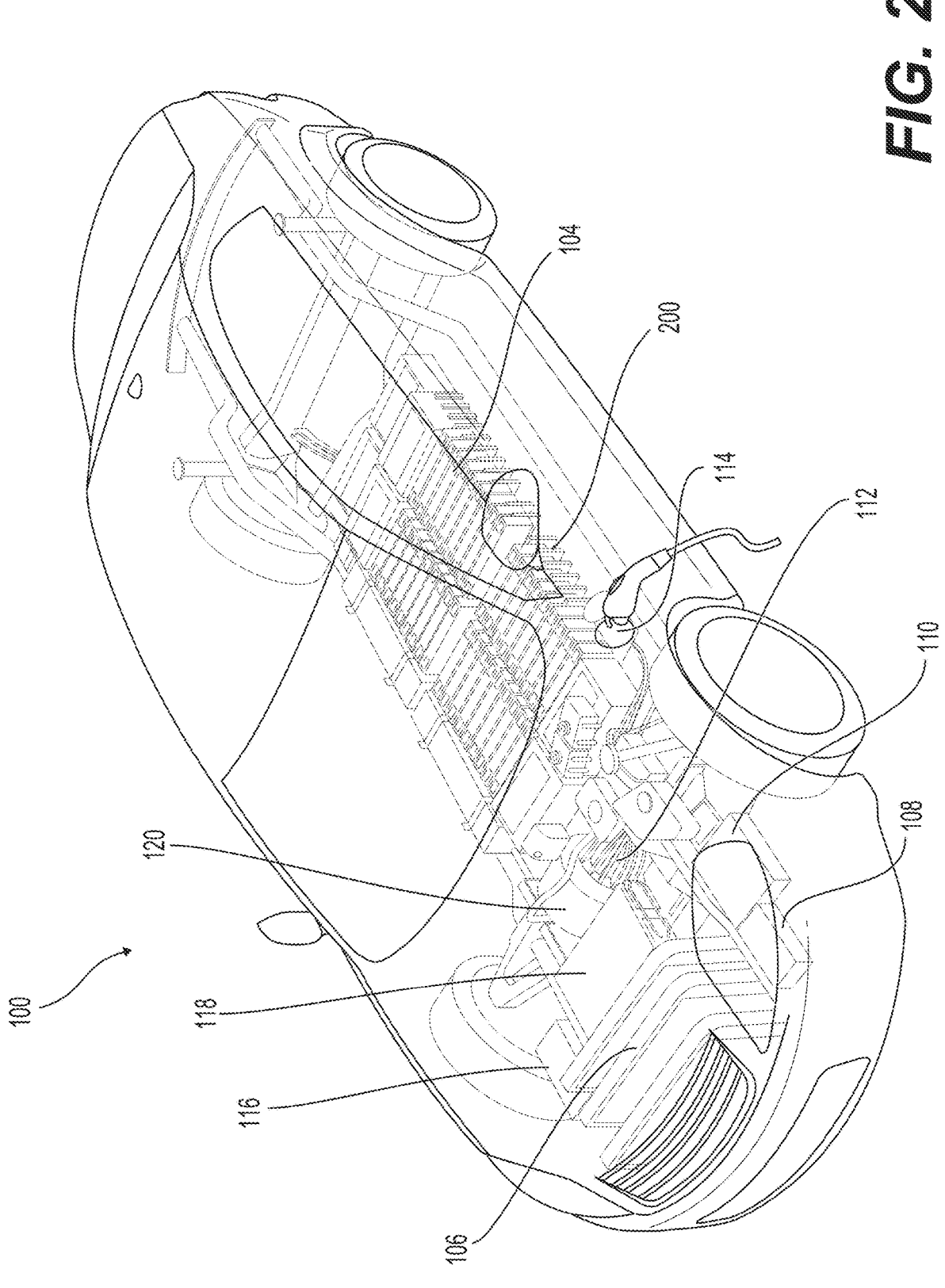
FIG. 2 illustrates the electric vehicle of FIG. 1, with the optical fiber-based sensing membrane removed, according to an example of the present disclosure.

FIG. 2 illustrates the electric vehicle 100 of FIG. 1, with the optical fiber-based sensing membrane 102 removed, according to an example of the present disclosure.

Referring to FIG. 2, the battery pack 104 is shown with the sensing membrane 102 removed. In this regard, the battery pack 104 may include, as shown, a plurality of battery cells 200. The sensing membrane 102 may be configured to sense thermal and/or strain variations, and/or vibrations associated with one, a few, or all of the battery cells 200 of the battery pack 104.

Figure 3:
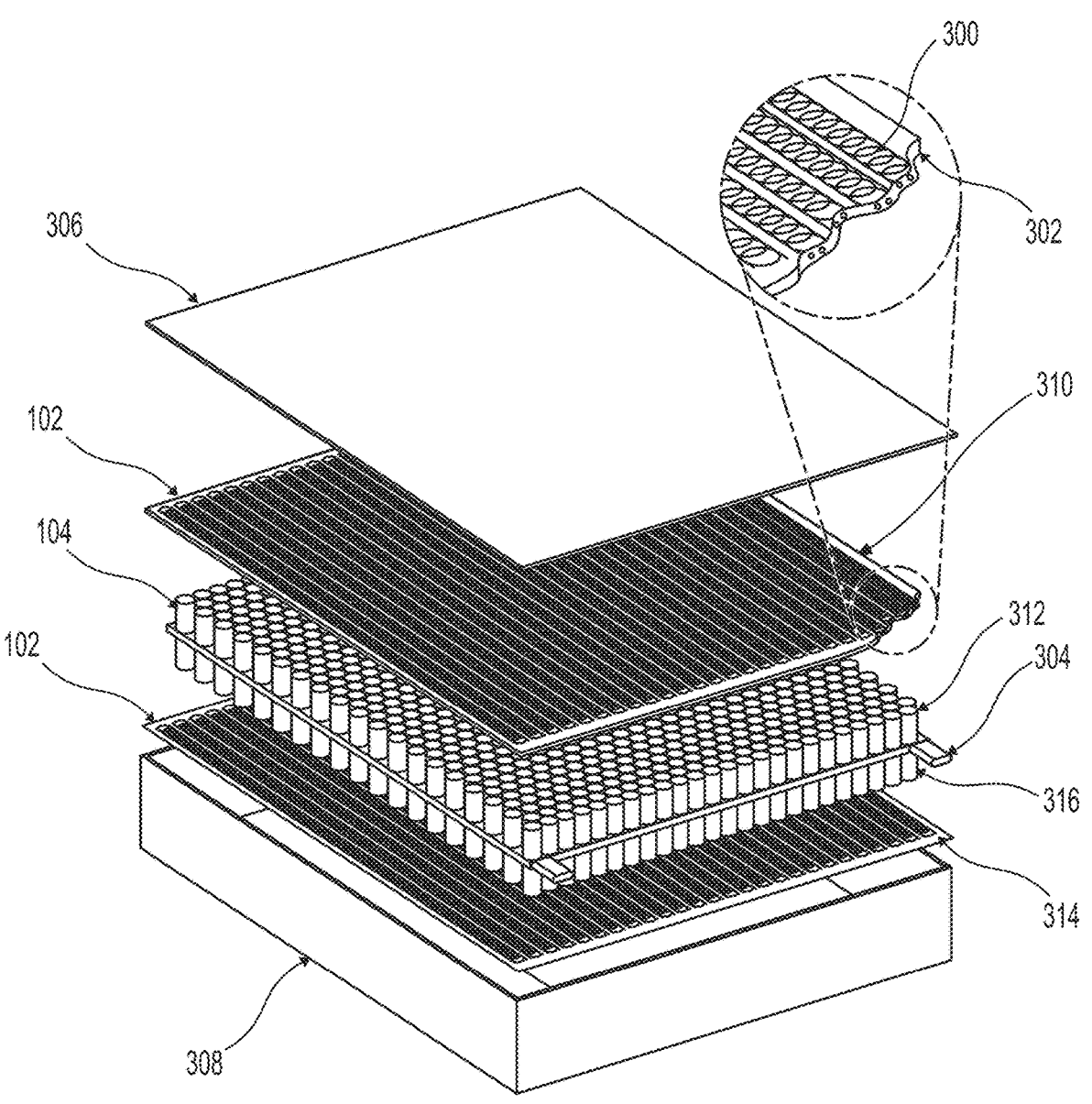
FIG. 3 illustrates a diagrammatic view illustrating the optical fiber-based sensing membrane of FIG. 1 in use, according to an example of the present disclosure.
Figure 3:
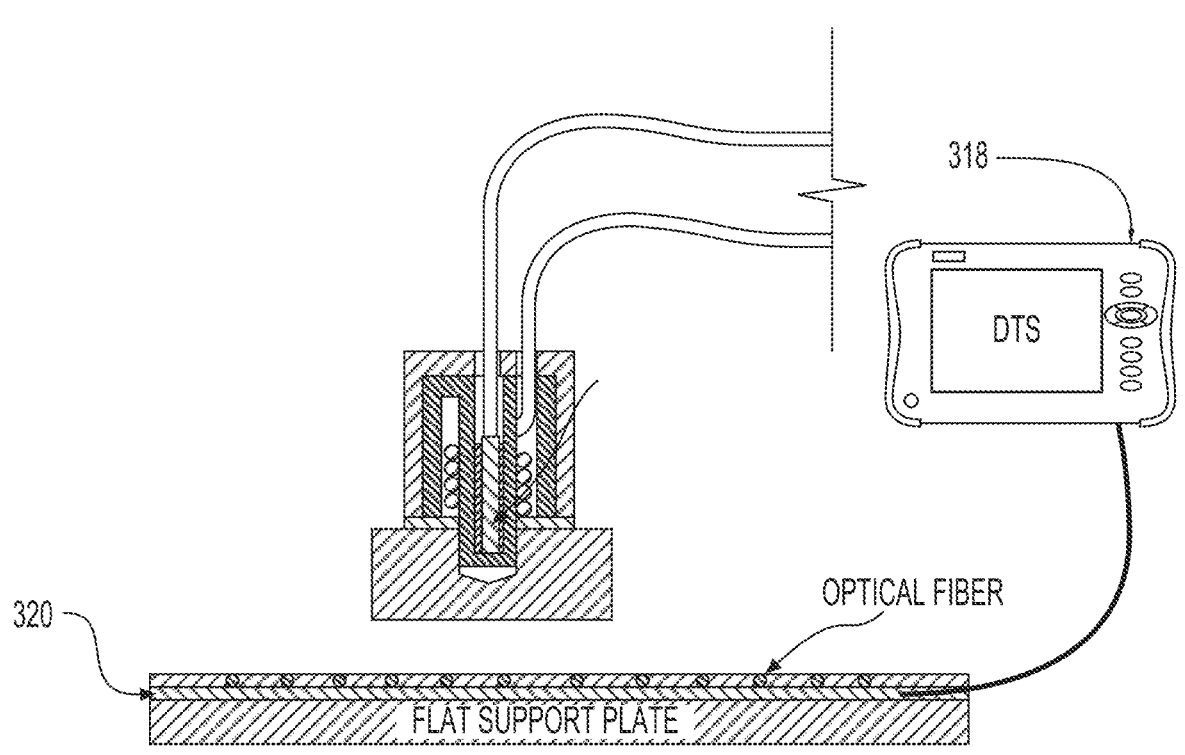
Figure 3:
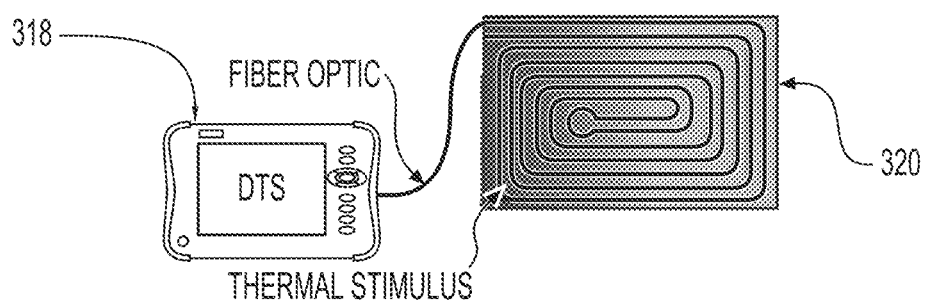

FIG. 3 illustrates a diagrammatic view illustrating the optical fiber-based sensing membrane 102 in use, according to an example of the present disclosure.

Referring to FIG. 3, the optical fiber-based sensing membrane 102 may include at least one optical fiber integrated in an adhesive substrate. In the example of FIG. 3, as shown in the enlarged view, a plurality of optical fibers 300 may be integrated in an adhesive substrate 302.

In the example of FIG. 3, sensing membranes may be disposed on upper and lower surfaces of the battery pack 104 in the orientation of FIG. 3. The battery pack 104 may include a plurality of battery cells. The battery cells may include, in the example shown, a cooling system 304 between upper and lower sets of battery cells in the orientation of FIG. 3. The upper and lower sensing membranes, and the battery pack 104 may be enclosed in an enclosure, with upper and lower layers 306 and 308 of the enclosure shown in the orientation of FIG. 3.

For the example of FIG. 3, the sensing membrane 102 at 310 may be used to sense thermal and/or strain variations, and/or vibrations of upper battery cells at 312, and the sensing membrane 102 at 314 may be used to sense thermal and/or strain variations, and/or vibrations of lower battery cells at 316.

The adhesive substrate may include Polyimide, or another such material. The Polyimide material may provide the requisite durability with respect to vibrations associated with the battery pack 104 and/or other components that may be engaged with the sensing membrane 102. Similarly, the Polyimide material may provide the requisite durability with respect to temperature variations associated with the battery pack 104 and/or other components, which may be on the order of −40° C. to 140° C., or include a greater range than −40° C. to 140° C. Further, the Polyimide material may provide the requisite flexibility associated with surface variations associated with the battery pack 104 and/or other components that may be engaged with the sensing membrane 102. The Polyimide material may also be transparent, and thus provide sufficient transmission of light into the optical fiber for detection of light or an anomaly (e.g., a high temperature event) associated with the battery pack 104. Some of the light produced by a spark, explosion or fire may then go through the membrane, be coupled to the optical fiber and guided to the optical head, and be detected by the same monitoring equipment also measuring temperature/ strain and acoustic vibrations.

The sensing membrane 102 may be of a light weight (e.g., 200-500 g/m$^2$). In this regard, the sensing membrane 102 may add minimal weight with respect to the device being monitored for thermal and/or strain variations, and/or vibrations.

The sensing membrane 102 may be approximately 0.5 mm, to thus minimize integration challenges with respect to the device being monitored for thermal and/or strain variations, and/or vibrations. In this regard, the optical fibers embedded in the sensing membrane 102 may be on the order of 0.25 mm in thickness. For the geometric patterns of optical fibers that include optical fiber crossings, such optical fibers may be treated after the sensing membrane is assembled, for example, by a combined action of pressure and temperature above the melting point of the optical fiber coating while the sensing membrane material is unaffected. Thus, the overall thickness of 0.5 mm may thus add minimal thickness associated with the battery pack 104.

With continued reference to FIG. 3, one example of a test set-up to evaluate performances of distributed temperature sensing systems based on distributed temperature sensing interrogator (DTS) 318 (also referred to herein as distributed temperature sensor) and fiber sensing membrane 320 is shown, and may be utilized to sense temperature, but also strain variations using a distributed strain sensing interrogator in place of the DTS. In this regard, the distributed temperature sensing interrogator 318, which may include an OTDR, may be utilized with the various examples of the sensing membrane 102 as disclosed herein.

Figure 4:
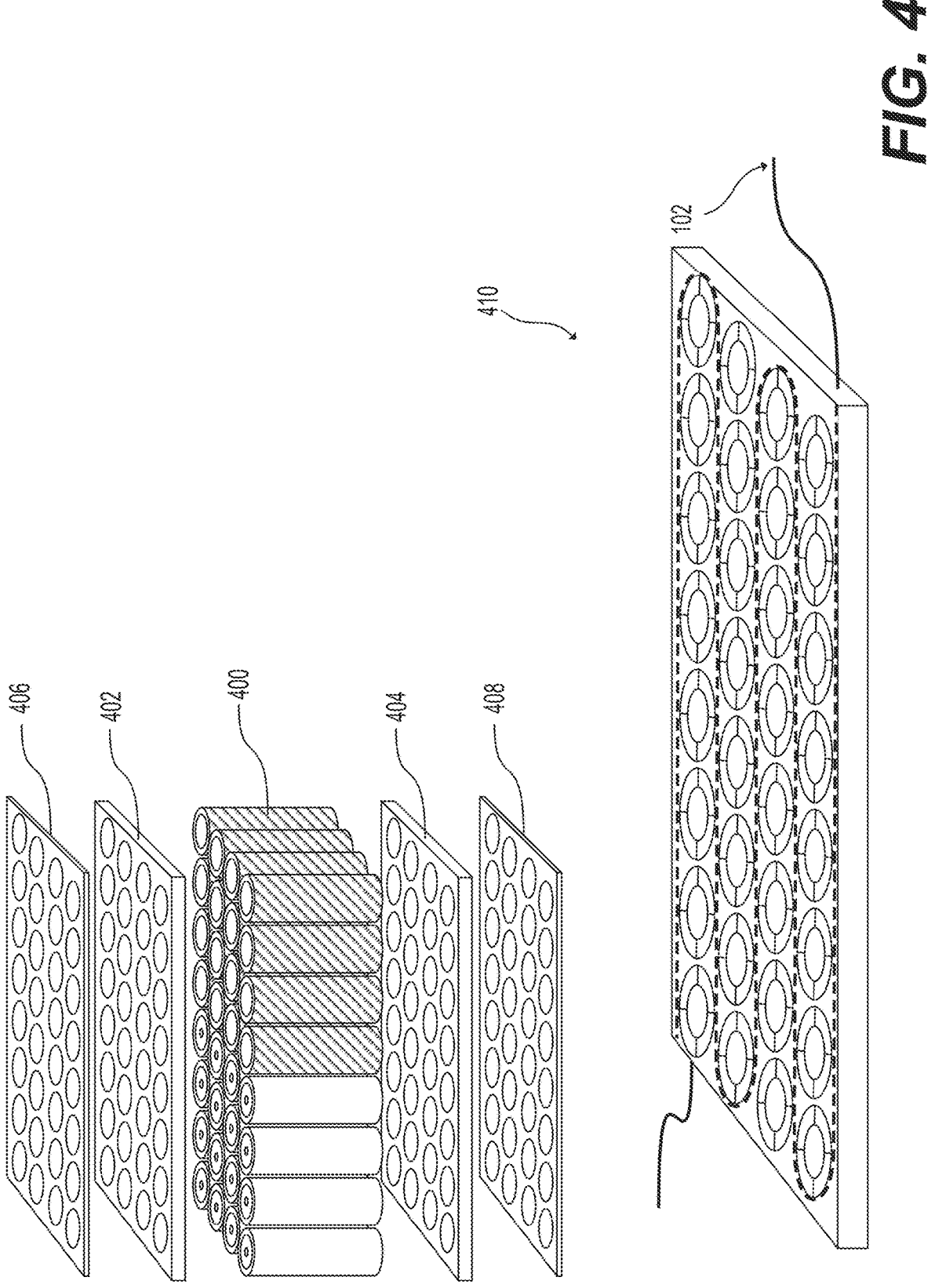
FIG. 4 illustrates an optical fiber-based sensing membrane layout including an optical fiber-based sensing membrane embedded in a battery cell insert, according to an example of the present disclosure.

FIG. 4 illustrates the sensing membrane layout 122 including the sensing membrane 102 embedded in a battery cell insert, according to an example of the present disclosure.

Referring to FIGS. 1 and 4, the sensing membrane 102 of the various geometric patterns disclosed herein may be embedded in a battery cell insert of the battery pack 104. For example, for the battery cells 400, a battery cell insert 402 may be positioned on an upper surface of the battery cells in the orientation of FIG. 4, and a battery cell insert 404 may be positioned on the lower surface of the battery cells. The battery pack 104 may further include a collector plate 406 positioned on an upper surface of the battery cell insert 402, and a collector plate 408 positioned on a lower surface of the battery cell insert 404. In this manner, as shown at 410, the sensing membrane 102 may be embedded in battery cell inserts 402 and 404.

Figure 5:
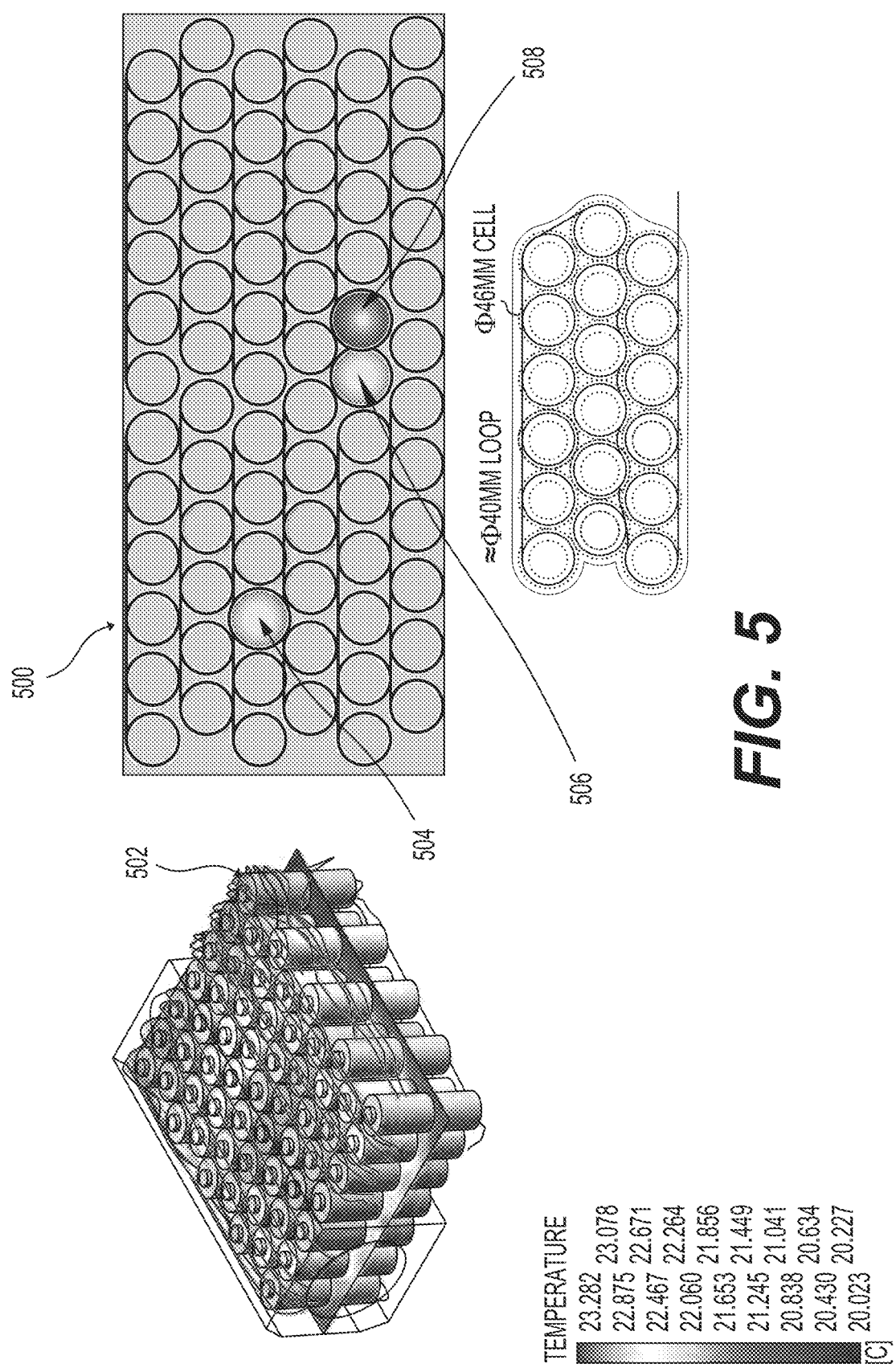
FIG. 5 illustrates an optical fiber-based sensing membrane layout including loops in series, according to an example of the present disclosure.

FIG. 5 illustrates the sensing membrane layout 122 including loops in series, according to an example of the present disclosure.

Referring to FIGS. 1 and 5, with respect to monitoring of the battery pack 104, the sensing membrane layout 122 may include loops in series as shown at 500. In this regard, each loop may be used to address a single battery cell 502 of the battery pack 104 or a defined group of cells if the cells are of too small dimensions. In this manner, when a temperature, strain, and/or vibration event occurs at a battery cell such as battery cell 504, 506, or 508, an associated loop may be used to detect a temperature, strain, and/or vibration event.

Figure 6:
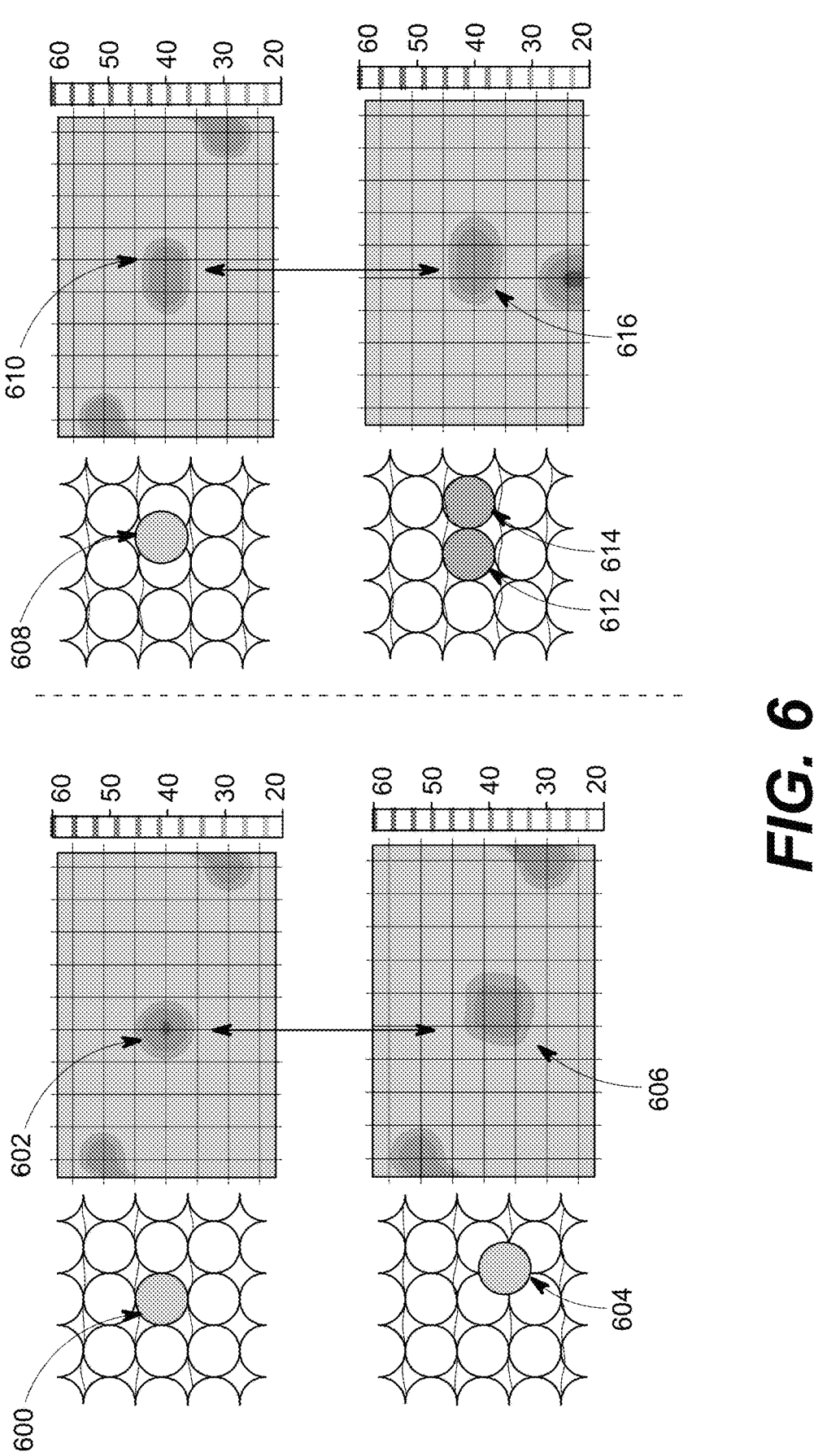
FIG. 6 illustrates examples of temperature reading dependence on hotspot placement, according to an example of the present disclosure.

FIG. 6 illustrates examples of temperature reading dependence on hotspot placement, according to an example of the present disclosure.

Referring to FIGS. 1 and 6, when a size of a local hotspot is as small as a sensing cell, a temperature reading may depend on hotspot placement. For example, a single hotspot at cell 600 may be seen as a single cell temperature reading at 602. However, at 604, the same hotspot that is offset between cells as shown may be also seen as a relatively larger hotspot corresponding to four cells at 606. Similarly, at 608, the same hotspot that is offset as shown may be also seen as a relatively larger hotspot corresponding to two cells at 610. Two hotspots at cells 612 and 614 may be seen as a two cell temperature readings at 616 (similar to the reading at 610). In this regard, the examples of FIGS. 7-11 may be implemented to determine a type of the hotspot (e.g., 600, 604, 608, 612, 614, etc.)

Thermal event magnitude may be underestimated when the event is smaller than a sensing cell or when the event covers only one part of a sensing cell. A first step to mitigate this may include utilizing a thermal diffuser. In this regard, it may be assumed that all subsequent parts of a hotspot that is smaller than a sensing cell are propagated as best as possible over the corresponding cell. Diffusion may be imperfect and the temperature anomaly may be underestimated. There is therefore a need for a correction factor on temperature which may be calibrated for application either with measurement or thermal calculations. Correction may be dependent on a size of the thermal event, the conductive or radiative coupling between thermal event and sensing cell, the thermal conductivity of all materials of the structure, and may also need dynamic tuning. A correction may be applied based on the assurance that the event extension does not fully cover a cell and/or temperature has not yet fully diffused to cover that cell, resulting in the need to evaluate the event size and location, based on the available information. The layout of FIGS. 8-11 thus provides for improvement in evaluation of the position and size of the thermal event, and application of a correction.

Figure 7:
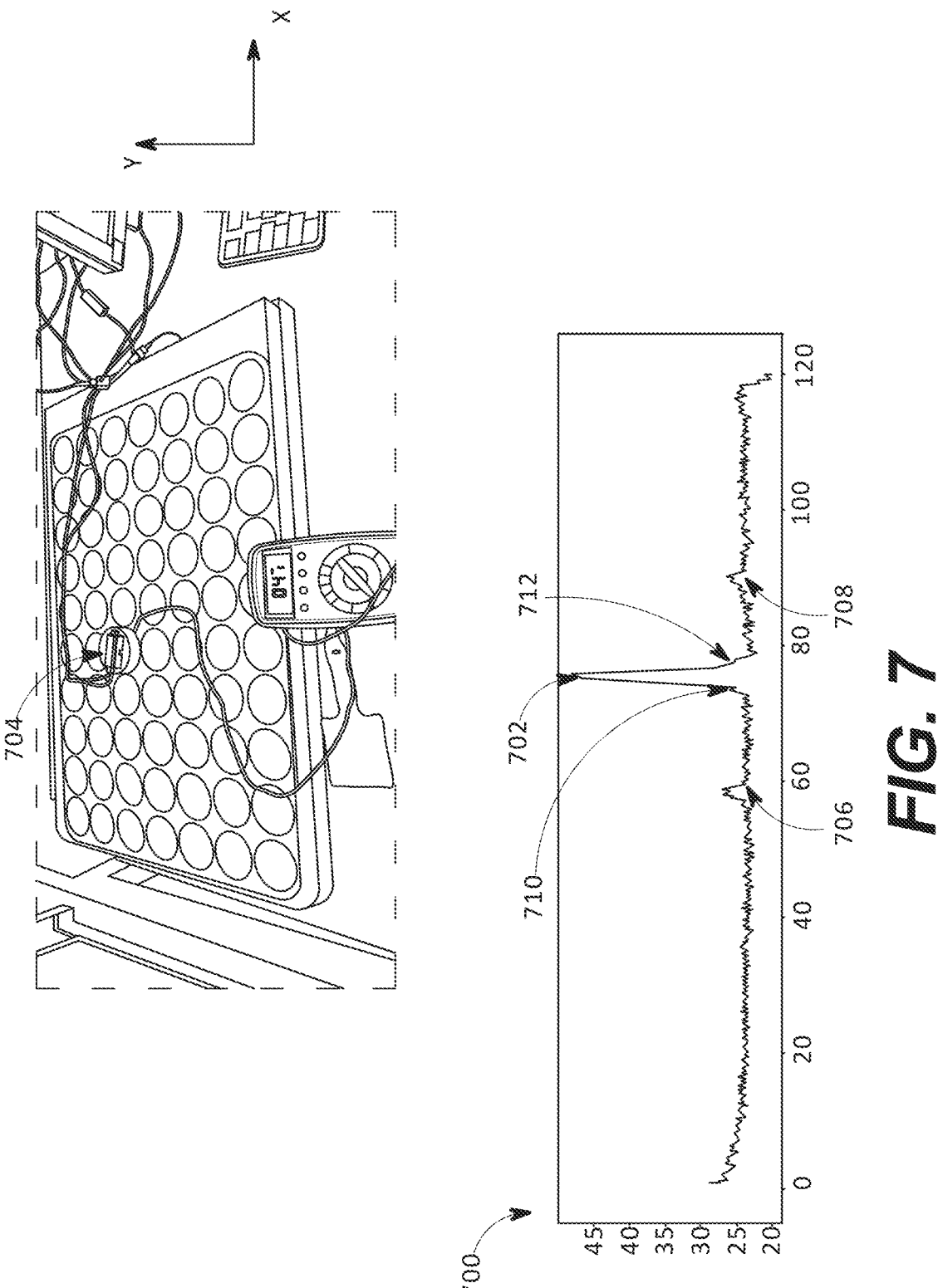
FIG. 7 illustrates side-lobe levels from neighboring spirals, according to an example of the present disclosure.

FIG. 7 illustrates side-lobe levels from neighboring spirals, according to an example of the present disclosure.

Referring to FIGS. 1 and 7, a plot 700 of temperature versus location is shown and includes a peak 702 due to a hotspot generated at 704, and Y-sidelobes 706 and 708. In this regard, X-sidelobes 710 and 712 appear to be merged into the event associated with peak 702. The X-sidelobes

710 and 712, while not as readily distinguishable as the Y-sidelobes 706 and 708, may however be utilized to locate the position and extension of the hotspot in the X dimension. In some cases, the instrument effective spatial resolution may be specified to be substantially smaller than the length of fiber included into each spiral. In other cases, a particularly precise positional calibration (e.g., from linear trace to two dimensional mapping) may be specified. The spatial extension and centering of the event in the X dimension may be determined through, for example, an estimate of the width at 10% of maximum (e.g., level crossing at 0.1*peak both sides), and a centroid determination. In some cases, it may be desirable to lay the fiber in such a way that each coil has no direct neighbor in the X dimension just as the Y dimension with the layout of FIGS. 4-7.

Figure 8:
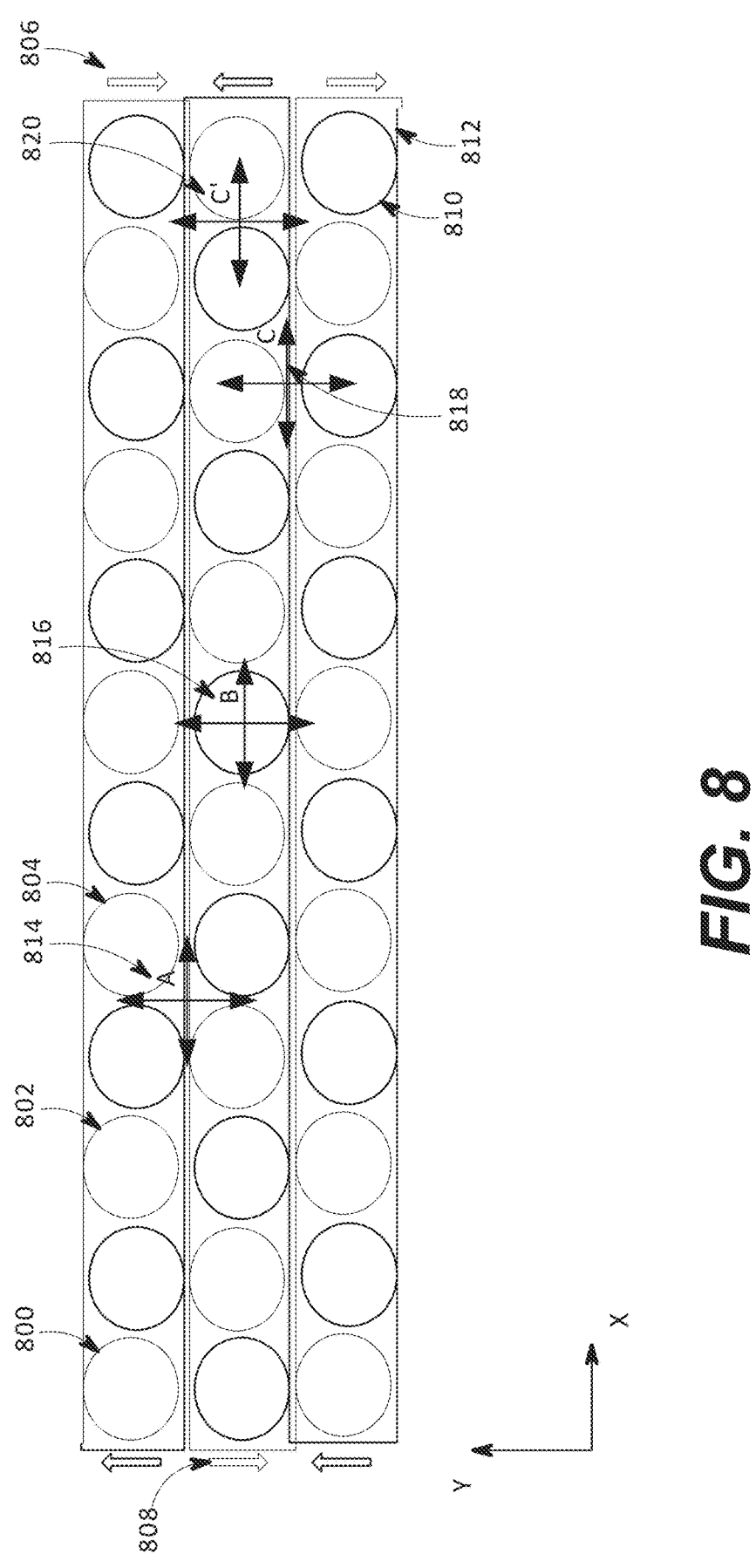
FIG. 8 illustrates an optical fiber-based sensing membrane layout including no direct neighbors, according to an example of the present disclosure.

FIG. 8 illustrates an optical fiber-based sensing membrane layout including no direct neighbors, according to an example of the present disclosure.

Referring to FIGS. 1 and 8, compared to the layout of FIGS. 4 and 5, for FIG. 8, each spiral may include no direct neighbor. For example, a spiral may start at 800, then continue to 802, then to 804, continuing to 806, then to 808, etc., with spiral 810 corresponding to the loop starting at 812. In this manner, side-lobes may be detectable in two dimensions (e.g., X and Y, compared to Y for FIG. 7). A key may be used to determine a hotspot location. For example, a key is specified below for the spiral layout of FIG. 8:

A: Quarter-case 4-spirals main event, no sidelobe

B: Center-case 1-spiral event, 4 sidelobes in XY dimensions

C: Halfway-case-Y 2-spirals main event, 4 sidelobes in X dimension

C': Halfway-case-X 2-spirals main event, 4 sidelobes in Y dimension

Referring to FIG. 8, if a plot such as plot 700 of FIG. 7 for the spiral layout of FIG. 8 shows no sidelobes, then the hotspot may be determined as event-A at 814 corresponding to "Quarter-case 4-spirals main event". Similarly, if a plot such as plot 700 of FIG. 7 for the spiral layout of FIG. 8 shows four sidelobes in the XY dimensions, then the hotspot may be determined as event-B at 816 corresponding to "Center-case 1-spiral event", etc. A similar analysis may be performed for event-C at 818 and event-C' at 820.

The amplitude of all sidelobes, relative to the main thermal event amplitude, provides for evaluation of the size of the thermal event. The precise position of the thermal event may be evaluated by a centroid calculation on the concerned area. From this information, the 2-dimensional (2D) representation of the thermal event may be corrected for improved matching to the reality, e.g., with a better accuracy on both positioning and thermal amplitude.

Thermal gradients and local inhomogeneities may be considered acceptable in many cases. The purpose of a monitoring system may include localizing and quantifying the advent of an abnormal thermal event, such as a sudden temperature elevation. In this regard, during a fast dynamic situation, there may be a very localized event that would need a correction of the thermal profile evaluation for the proper assessment of the situation, and in particular the magnitude and the rate of change of the temperature anomaly. In order to separate the new event from baseline gradients and inhomogeneities, the present temperature trace may be compared to a reference trace, for example, by subtracting it. The reference trace may be a recent past trace, acquired at a fixed temporal delay before the present trace. It may also be a numerically chosen trace from a past acquisition database or a numerically determined trace exploiting the long term history of measurements, the recent history of measurements, potentially exploiting other sensors and data representative of the past and present state and use of the element being monitored (e.g., for example the charge of discharge current history, the external temperature, etc.), to determine an expected thermal profile under normal operating conditions. Reference subtraction may either be applied on raw 1 D data or a 2D map representation with the same result. In the relative data, a thermal event and eventual sidelobes may then be analyzed, with the data being corrected as disclosed herein.

Figure 9:
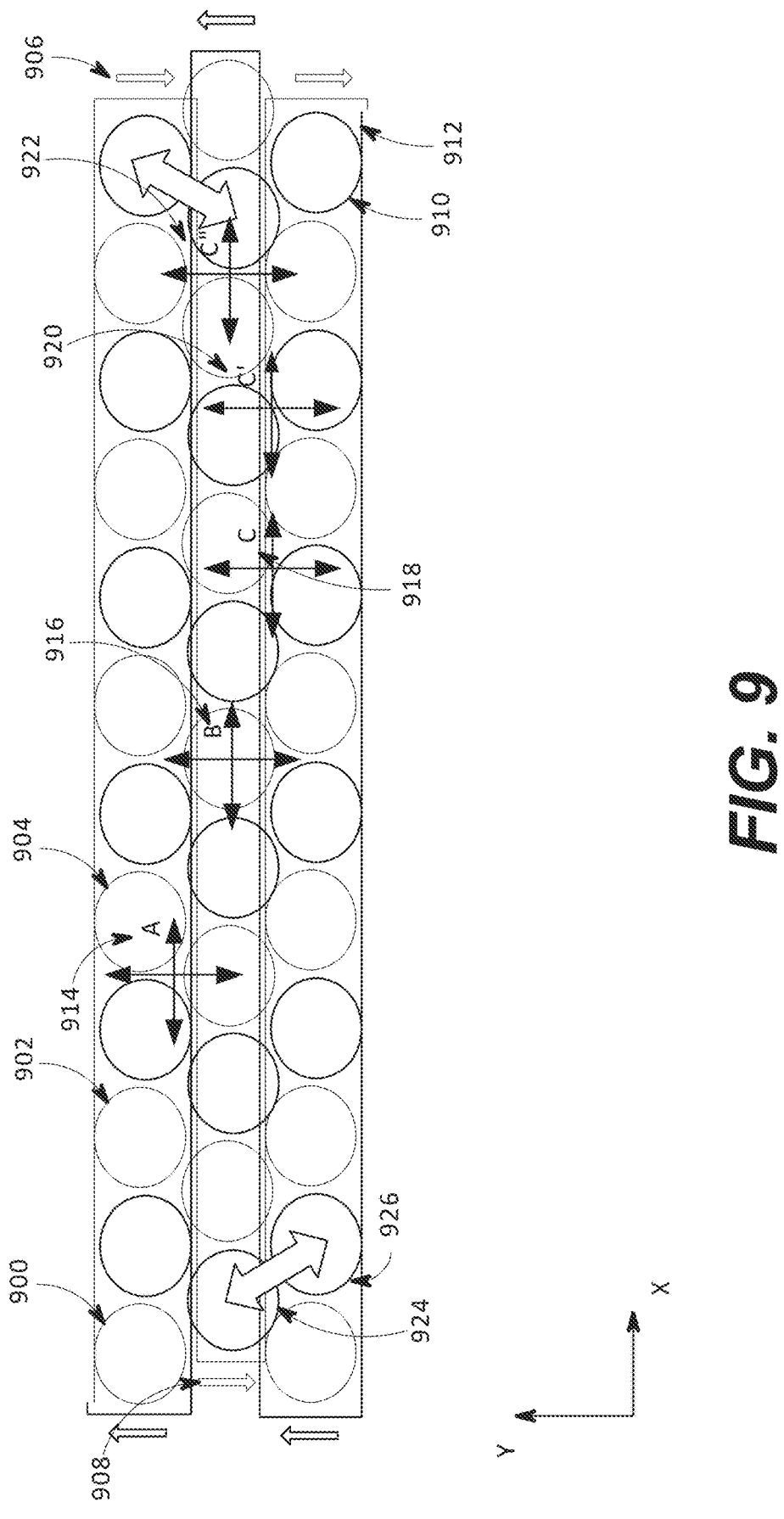
FIG. 9 illustrates an optical fiber-based sensing membrane layout where spirals are arranged for maximal Y-axis density, according to an example of the present disclosure.

FIG. 9 illustrates an optical fiber-based sensing membrane layout where spirals are arranged for maximal Y-axis density, according to an example of the present disclosure.

Referring to FIGS. 1 and 9, the example of FIG. 9 represents a case where spirals are arranged for maximal Y-axis density. In this case, the center row of spirals may be axially offset from adjacent rows of spirals to provide a maximal density in a specified direction. This triangular configuration may also be advantageously chosen so that the spiral pattern matches the pattern of the items being monitored, e.g., in particular in the case of a cylindrical-cell battery arrangement, one sensing cell always covers one battery cell or one group of cells with the same overlap and thermal coupling. Some neighbors (e.g., neighbors 924 and 926) are also direct neighbors on the 2D membrane. For FIG. 9, a spiral may start at 900, then continue to 902, then to 904, continuing to 906, then to 908, etc., with spiral 910 corresponding to the loop starting at 912. In this manner, side-lobes may be detectable in two dimensions (e.g., X and Y, compared to Y for FIG. 7). A key may be used to determine a hotspot location. For example, a key is specified below for the spiral layout of FIG. 9:

A: Third, 3-spirals main event, no sidelobe

B: Center-case 1-spiral event, 6 sidelobes in XY dimensions

C, C', C": Halfway-case 2-spirals main event, 2 sidelobes in L dimension

Referring to FIG. 9, if a plot such as plot 700 of FIG. 7 for the spiral layout of FIG. 9 shows no sidelobes, then the hotspot may be determined as event-A at 914 corresponding to "Third, 3-spirals main event". Similarly, if a plot such as plot 700 of FIG. 7 for the spiral layout of FIG. 9 shows 6 sidelobes in XY dimensions, then the hotspot may be determined as event-B at 916 corresponding to "Center-case 1-spiral event", etc. A similar analysis may be performed for event-C at 918, event-C' at 920, and event-C" at 922.

Figure 10:
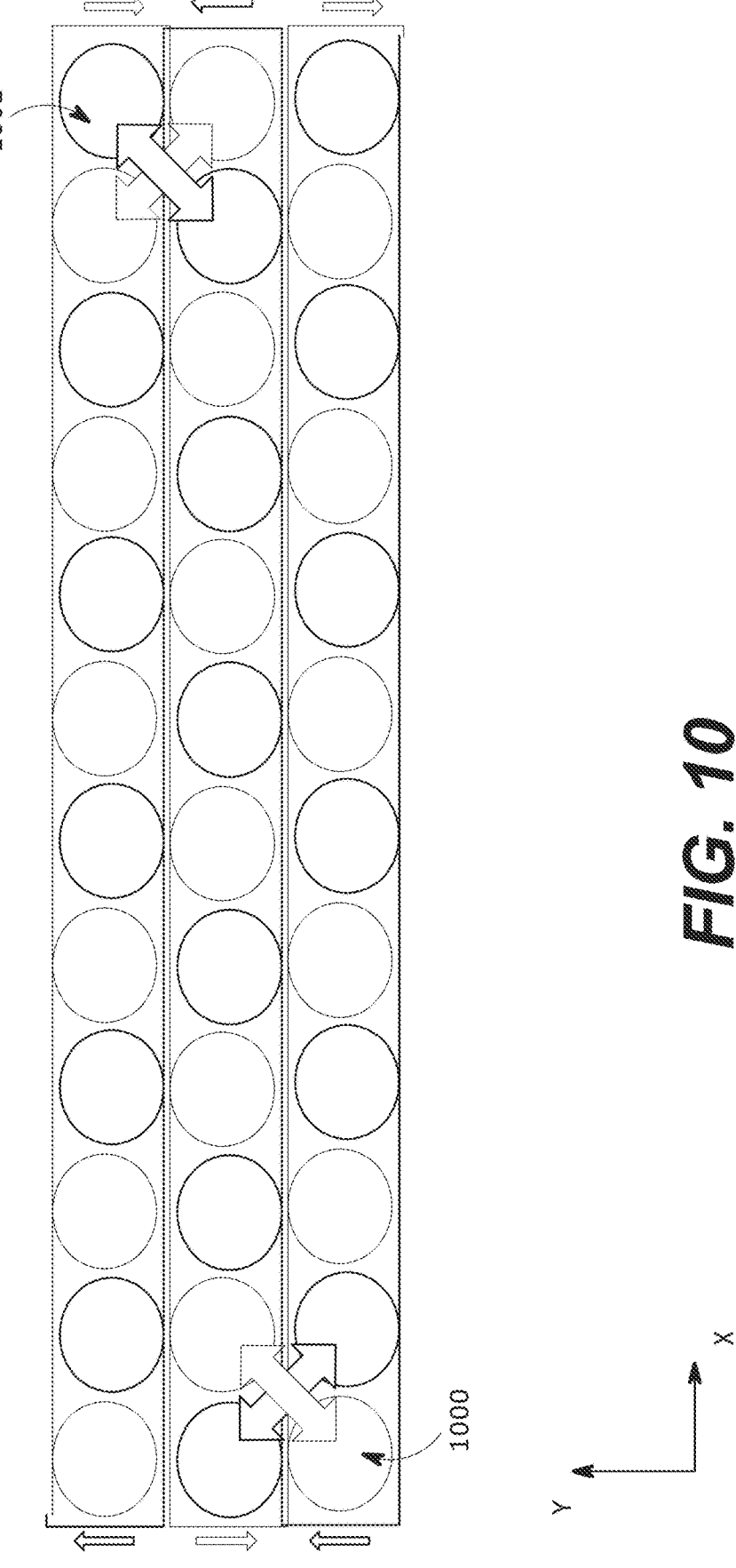
FIG. 10 illustrates operation of the optical fiber-based sensing membrane layout of FIG. 8, according to an example of the present disclosure.

FIG. 10 illustrates operation of the optical fiber-based sensing membrane layout of FIG. 8, according to an example of the present disclosure.

Referring to FIGS. 1 and 10, the layout of FIG. 10, which is identical to FIG. 8, may facilitate detection of side-lobes in two dimensions. For example, the layout of FIG. 10 may facilitate detection of side-lobes in two dimensions as shown at 1000 and 1002.

Figure 11:
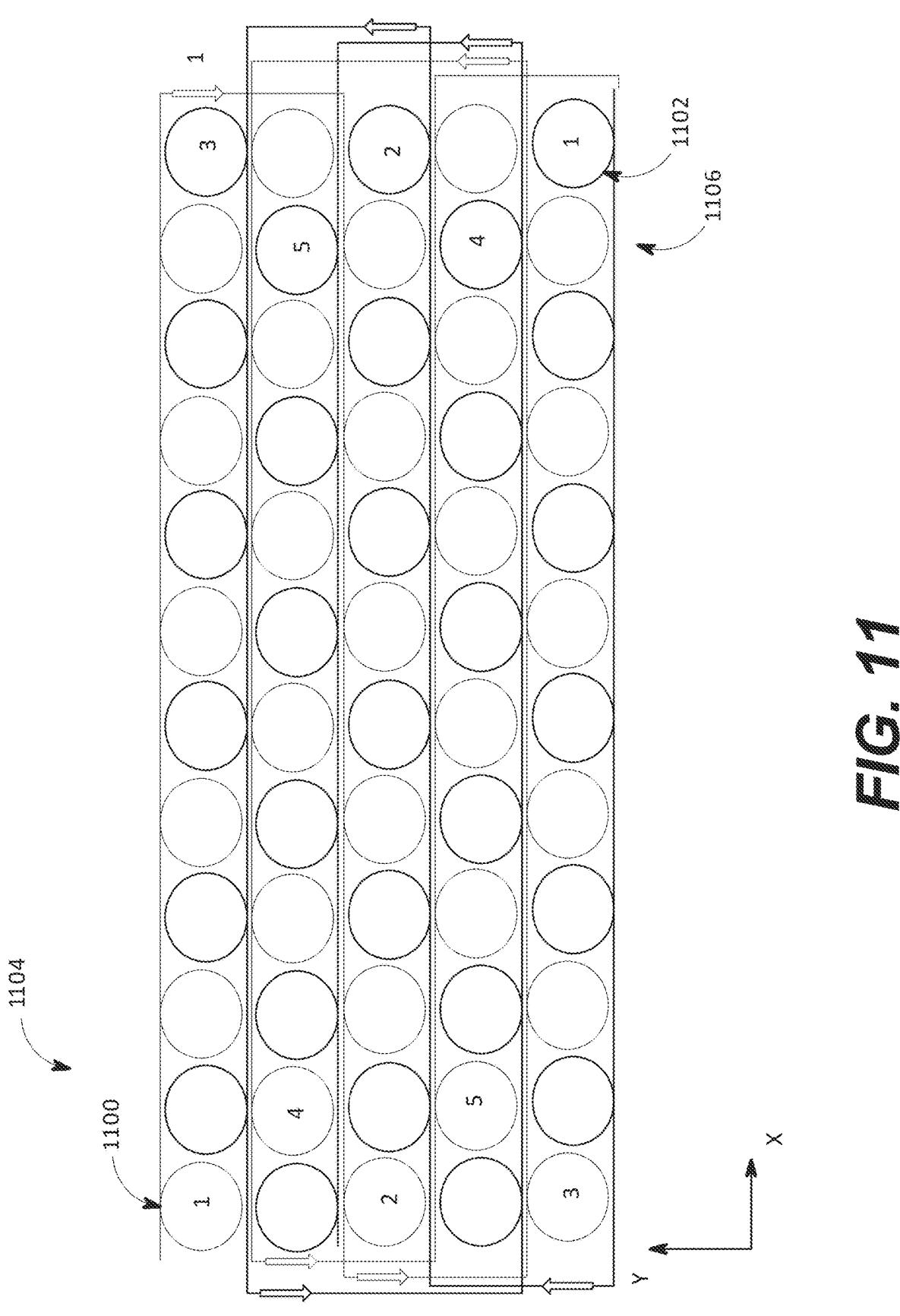
FIG. 11 illustrates an optical fiber-based sensing membrane layout with spirals and rows skipped, according to an example of the present disclosure.

FIG. 11 illustrates an optical fiber-based sensing membrane layout with spirals and rows skipped, according to an example of the present disclosure.

Referring to FIGS. 1 and 11, the layout of FIG. 11 may include skipped spirals and rows. For example, path 1100 may include a general trend downward, and path 1102 may include a general trend upward. For example, path 1100 may include rows labeled as 1, 2, 3, 4, and 5 generally at 1104, where rows 4 and 5 are skipped. Similarly, path 1102 may include rows labeled as 1, 2, 3, 4, and generally at 1106, where rows 4 and 5 are skipped. Yet further, as with the example of FIG. 8, each spiral may include no direct neighbor.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An optical fiber-based sensing membrane comprising:
  at least one optical fiber; and
  a substrate, wherein the at least one optical fiber is integrated in the substrate, the optical fiber-based sensing membrane includes, based on a specified geometric pattern of the at least one optical fiber, an optical fiber-based sensing membrane layout, the substrate includes a thickness and a material property, and
  the thickness and the material property are specified to ascertain, via the at least one optical fiber and based on the optical fiber-based sensing membrane layout, at least one of a thermal or a mechanical property associated with a device, or a radiation level associated with a device environment,
  wherein the specified geometric pattern of the at least one optical fiber includes a spiral geometric pattern, and
  wherein each spiral of the spiral geometric pattern includes no direct neighbor, and wherein the spiral geometric pattern is associated with a particular spatial key that is used to detect sidelobes in a first and a second dimension.

2. The optical fiber-based sensing membrane according to claim 1, wherein the device includes a battery pack of an electric vehicle.

3. The optical fiber-based sensing membrane according to claim 1, wherein the mechanical property includes at least one of strain or vibration.

4. The optical fiber-based sensing membrane according to claim 1, wherein a row of spirals of the spiral geometric pattern is axially offset from adjacent rows of spirals to provide a maximal density in a specified direction.

5. The optical fiber-based sensing membrane according to claim 1, wherein rows of spirals of the spiral geometric pattern for a path of an optical fiber of the at least one optical fiber include an intermediate row of spirals of the spiral geometric pattern for the path of the optical fiber of the at least one optical fiber.

6. A method comprising:
  embedding an optical fiber-based sensing membrane in a device or contiguously engaging the optical fiber-based sensing membrane with the device, wherein the optical fiber-based sensing membrane includes:
    at least one optical fiber; and
    a substrate, wherein
      the at least one optical fiber is integrated in the substrate,
      the optical fiber-based sensing membrane includes, based on a specified geometric pattern of the at least one optical fiber, an optical fiber-based sensing membrane layout, and
      the substrate includes a thickness and a material property; and ascertaining, via the embedded or the contiguously-engaged optical fiber-based sensing membrane, a thermal or a mechanical property associated with the device, wherein the specified geometric pattern of the at least one optical fiber includes a spiral geometric pattern, and wherein each spiral of the spiral geometric pattern includes no direct neighbor, and wherein the spiral geometric pattern is associated with a particular spatial key that is used to detect sidelobes in a first and a second dimension.

7. The method according to claim 6, wherein the device includes a battery pack of an electric vehicle.

8. The method according to claim 6, wherein the optical fiber-based sensing membrane is transparent so as to receive light, further comprising:

transmitting, by the at least one optical fiber, received light to an interrogator;

receiving, based on an analysis of the light by the interrogator and from the interrogator, a signal; and generating, based on the received signal, an alarm.

9. The method according to claim 6, wherein a row of spirals of the spiral geometric pattern is axially offset from adjacent rows of spirals to provide a maximal density in a specified direction.

10. The method according to claim 6, wherein rows of spirals of the spiral geometric pattern for a path of an optical fiber of the at least one optical fiber include an intermediate row of spirals of the spiral geometric pattern for the path of the optical fiber of the at least one optical fiber.

11. The method according to claim 6, wherein ascertaining, via the embedded or the contiguously-engaged optical fiber-based sensing membrane, the thermal or the mechanical property associated with the device further comprises:

analyzing a sidelobe pattern in a temperature plot associated with the optical fiber-based sensing membrane.

12. The method according to claim 11, wherein analyzing the sidelobe pattern in the temperature plot associated with the optical fiber-based sensing membrane further comprises:

determining whether the sidelobe pattern includes no sidelobe; and based on a determination that the sidelobe pattern includes no sidelobe, specifying the thermal or the mechanical property associated with the device as a type of event associated with no sidelobe.

13. The method according to claim 11, wherein analyzing the sidelobe pattern in the temperature plot associated with the optical fiber-based sensing membrane further comprises:

determining whether the sidelobe pattern includes four sidelobes in two dimensions; and based on a determination that the sidelobe pattern includes four sidelobes in two dimensions, specifying the thermal or the mechanical property associated with the device as a type of event associated with four sidelobes in two dimensions.

14. The method according to claim 11, wherein analyzing the sidelobe pattern in the temperature plot associated with the optical fiber-based sensing membrane further comprises:

determining whether the sidelobe pattern includes four sidelobes in one dimension; and based on a determination that the sidelobe pattern includes four sidelobes in one dimension, specifying the thermal or the mechanical property associated with the device as a type of event associated with four sidelobes in one dimension.

15. The method according to claim 11, wherein analyzing the sidelobe pattern in the temperature plot associated with the optical fiber-based sensing membrane further comprises:

determining whether the sidelobe pattern includes six sidelobes in two dimensions; and based on a determination that the sidelobe pattern includes six sidelobes in two dimensions, specifying the thermal or the mechanical property associated with the device as a type of event associated with six sidelobes in two dimension.

16. An optical fiber-based sensing membrane comprising:

at least one optical fiber formed in a specified geometric pattern, wherein the specified geometric pattern is associated with a particular spatial key that is used to detect sidelobes in a first and a second dimension, wherein the specified geometric pattern includes a spiral geometric pattern, and wherein each spiral of the spiral geometric pattern includes a specified layout relative to a neighboring spiral.

17. The optical fiber-based sensing membrane according to claim 16, wherein the specified geometric pattern is specified to ascertain, via the at least one optical fiber, at least one of a thermal or a mechanical property associated with a device, or a radiation level associated with a device environment, and wherein the device includes a battery pack of an electric vehicle.

18. The optical fiber-based sensing membrane according to claim 17, wherein the mechanical property includes at least one of strain or vibration.

19. The optical fiber-based sensing membrane according to claim 16, wherein a row of spirals of the spiral geometric pattern is axially offset from adjacent rows of spirals to provide a maximal density in a specified direction.

20. The optical fiber-based sensing membrane according to claim 16, wherein rows of spirals of the spiral geometric pattern for a path of an optical fiber of the at least one optical fiber include an intermediate row of spirals of the spiral geometric pattern for the path of the optical fiber of the at least one optical fiber.

* * * * *